Oct. 19, 1965   A. B. NEWTON   3,212,562
SUMMER-WINTER CONTROLS
Filed May 10, 1963
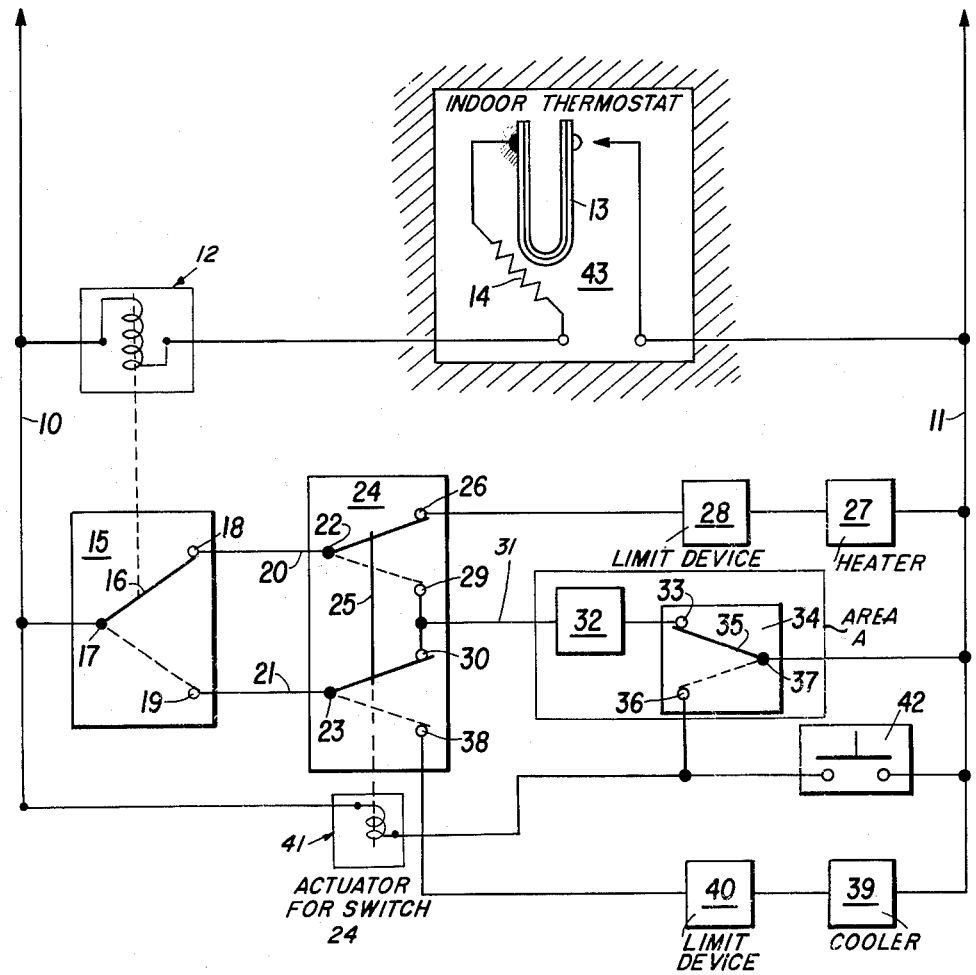
INVENTOR
ALWIN B. NEWTON
BY Thomas J. Greer
ATTORNEY

United States Patent Office

3,212,562
Patented Oct. 19, 1965

3,212,562
SUMMER-WINTER CONTROLS
Alwin B. Newton, Spring Garden Township, York County, Pa., assignor to Borg-Warner Corporation, Chicago, Ill., a corporation of Illinois
Filed May 10, 1963, Ser. No. 279,235
12 Claims. (Cl. 165—12)

This invention relates to a temperature controlled system and more particularly to an automatic summer-winter control system for domestic as well as industrial temperature control applications.

With the advent of an increasing percentage of residential all-year air conditioning, it becomes necessary to provide not only reliable control devices, but also devices which are simple and hence inexpensive, thereby allowing an even greater number of residential installations to enjoy the advantages of all-year air conditioning.

According to the present invention, an all-year air conditioning control system is provided which includes a time delay, in association with both the heating and cooling operations, which will account and compensate for transient changes in either heating or cooling demand as might be caused by factors which do not linearly represent external temperature conditions. For example, on a certain day where weather conditions dictate a cooling of a controlled atmosphere in a residence, a sudden thunderstorm might cause a transient decrease in temperature. Without some means of differentiating between a transient and a more permanent or long-term decrease in temperature, an all-year air conditioning system would be compelled to inaugurate its heating action, even though the transient condition might occur during an extended period of warm weather. Similarly, a transient increase in temperature during the winter season might call for the cooling action of an all-year air conditioning system.

Accordingly, it is an object of the present invention to provide an all-year air conditioning system which differentiates between transient and long term conditioning commands.

It is a further object of the present invention to provide an all-year air conditioning system employing a thermostat in combination with a single timing element to enable the system to differentiate between transient and long term conditioning requirements.

It is a further object of the present invention to provide an all-year air conditioning system employing a bimetal temperature senser provided with a heating element contiguous thereto to reduce heating overruns, in combination with a timing element to enable the system to differentiate between transient and long term conditioning requirements.

It is a further object of the present invention to provide an all-year conditioning system which is susceptible, by manual operation, of instantaneously reverting to either a cooling or a heating action whenever desired.

It is a further object of the present invention to provide an all-year air conditioning system, employing a single timing device, the system yielding both a heating and a cooling operation, the system intermittently heating or cooling for short term departures from a control point, and changing from one mode of operation to the other for longer term departures.

These and other objects and advantages of the following invention will be apparent from the following description.

In the drawings:

The sole figure is a schematic representation of the all-year air conditioning system according to the present invention.

Referring now to the figure of the drawings, the numerals 10 and 11 denote the two sides of an electrical power supply system across which the various components to be described are placed. A relay 12 is set in series with a conventional bimetal thermostat 13 and a resistance heater 14 in close proximity with the latter. The bimetal element 13, synonymously a bimetal thermostat, is so constructed that above any convenient predetermined ambient temperature, say 75° F., the bimetal will move to break electrical contact. Below this desired control point or control temperature, the bimetal will make electrical contact. In the event electrical contact is made, the resistance heater 14 is energized and the heat therefrom acts on the bimetal to raise the latter's temperature and thus urge it to break electrical contact. The resistance heater 14, in combination with the bimetal element 13, is termed an anticipating heater and functions to inhibit overruns in a manner to be more fully set forth later in the description of the invention.

The numeral 15 denotes a single pole double throw switch whose blade 16 is alternately swingable from common contact 17 to upper and lower contacts 18 and 19 respectively, the blade's position determined by relay 12.

Leads 20 and 21 secure contacts 18 and 22 and 19 and 23 together, respectively, the contacts 22 and 23 being portions of a double pole double stepping throw switch 24 whose movable blades are suitably coupled as at 25. Contact 26 is secured to a limit device denoted by the numeral 28, the latter placed in series with any conventional heating means 27. It will be understood that heating means 27, in addition to assuming the form of any one of a great number of heating devices, may be an actuator, as for example a valve or the like in a gas heating system. The function of the limit means 28 is to terminate the operation of heating means 27 upon the attainment of a heating action greater than normal or a current or potential surge greater than normal.

Common terminals 29 and 30 of switch 24 are secured by lead 31 to a timing device 32 whose characteristics will presently be set forth. The timer 32 is coupled to one contact 33 of a single pole double throw switch 34 whose blade 35 is alternately swingable between contact 33 and contact 36 from common contact 37. Blade 35 is normally in the shown position and swings downwardly into the dashed position only after the running of the complete period of the timer, at which time it swings downwardly for a short time only, touching contact 36, and then swinging upwardly again.

Contact 38 of switch 24 is coupled to any conventional cooling means, denoted by the numeral 39, through series limit means 40. Cooling means 39 and limit means 40 are the cooling counterpart of heating means 27 and limit means 28. Thus, it will be understood that means 39 may represent any conventional cooling means or an actuator therefor and limit means 40 serves to discontinue the operation of means 39 in the event of a cooling action or pressure condition greater or less than scheduled or for an abnormal current or voltage surge.

The numeral 41 denotes an actuator for switch 24 and is suitably coupled to blade coupling element 25, the latter linking the two arms of switch 24. The actuator 41, when energized, changes the position of coupling element 25 and therefore the position of the blades of switch 24. Switch 24 is a stepping switch in the sense that it will remain in the last position to which it was actuated until reactuated, at which time, it will assume its other configuration and also remain there until again reactuated. This switch may comprise any conventional type, one of which, for example, employs a rotary switching element and a ratchet and pawl indexing mechanism which is actuated by a linearly moveable solenoid output or other device. When the actuating means is energized, the operating mechanism will advance the switching element to its alternate position and will remain in this position until re-actuated, even if the operating mechanism is withdrawn. The numeral 42 denotes a manually operated switch, such as a push button, placed in series with actuator 41 across lines 10 and 11. Its function will be given later.

The operation of the all-year air conditioning system according to the present invention will now be set forth. Thermostat 13 with its associated anticipating heating element 14 are suitably mounted together, as on a bracket 43, such that the heat from element 14 will influence thermostat 13 as previously described. The thermostat, with its associated heater, is placed in an enclosure whose temperature is to be controlled by the heating means 27 and the cooling means 39.

Assume now that the thermostat 13 calls for heating, i.e., sensing that the enclosure temperature is below the desired temperature, say 75° F., in the enclosure by a predetermined amount. In this situation, bimetal element 13 is making electrical contact. Relay 12 will be actuated, in one way, and blade 16 of switch 15 placed in the illustrated position with terminals 17 and 18 connected. Assuming the initial configuration of double pole double-throw switch 24 to be that illustrated, the circuit defined by lead 20 and contacts 22 and 26 allows the energization of heating means 27 and the system is now on the heating cycle or the heating phase of its operation. It will be observed that in the position of the switches illustrated, only the relay 12 and the heating means 27 will be energized since the full line switch positions preclude the energization of any of the other described elements. It will be observed that, as previously set out, anticipatory heater 14 is also energized and thus acts to heat the bimetal so as to tend to interrupt the electrical contact. Since there is usually a time lag between the attainment of a desired temperature in a controlled atmosphere and the simultaneous sensing and activation by a thermostat, overruns are generally present. The overruns represent the amount of heat supplied to the controlled atmosphere or enclosure by the heating means between the time of attainment of the desired temperature and the time of actuation of the thermostat. The heater 14 inhibits such overruns by heating the bimetal, the bimetal thus moving to break electrical contact (and hence stopping the heating action of means 27) sooner than otherwise and diminishing the noted time difference.

Assume now that heating is no longer required, as sensed by thermostat 13. The electrical contact thereof will break and relay 12 will now be actuated, in an opposite way, and blade 16 of switch 15 is now placed in the dotted position, coupling contacts 17 and 19. Current now passes from line 10 through lead 21 to contact 23 of stepping switch 24, it being observed that the energy to heating means 27 is no longer available because of the change in position of blade 16. From contact 23, current passes to contact 30, lead 31 and thence to timing device 32. Because of the illustrated position of blade 35 of switch 34, the timing device is now energized. The timing device functions to change the position of blade 35 (to other contact terminal 36) and thus energize actuator 41, but only after being energized for a predetermined time. For heating applications, particularly for domestic use, the period of timer 32 may be set from 30 to 240 minutes.

The timing device may be of any conventional type which includes means for re-setting the timing mechanism in the event it is de-energized before the predetermined time period has lapsed. For example, this timing device may take the general form of the timer illustrated and described in U.S. Patent No. 2,548,604, issued to R. H. Hickey on April 10, 1951. Although the aforementioned Hickey timer discloses a single-pole, single-throw switch, it may be readily adapted to provide a single-pole, double-throw switch in which the blade in one position closes a circuit to the timing motor and is moved at the end of the time period to its second position. Applying such a switch to the circuit shown in FIGURE 1, upon movement to the second position, the blade 35 closes contacts 36, 37 and momentarily energizes actuator 41 to advance switch 24. The motor circuit through contacts 33, 34 opens, causing the timer to re-set itself, thereby moving the blade black to the position bridging contacts 33 and 34. It will be appreciated that other forms of timing devices may be employed, such as thermally actuated, etc.

In the event that heating is again called for by thermostat 13 before the elapse of the timer's period, blade 16 of switch 15 will be placed in the original position (coupling contacts 17 and 18), and the action of heating means 27 reinaugurated. It will be observed in this case that actuator 41 of stepping switch 24 will not be energized, since the predetermined period must elapse before blade 35 swings to contact 36, thus energizing actuator 41. Blade 16 having gone back to the heating (solid) position now, timer 32 will become deenergized, and reset to zero time in preparation for timing the next "off" period.

In the event that heating of the temperature controlled enclosure is not called for by thermostat 13 during the period of timer 32, electrical contact remains broken by the bimetal and the timer will cause blade 35 of switch 34 to swing downwardly to contact 36, thereby energizing actuator 41. The blades of stepping switch 24 will now be moved by actuator 41 into the dotted position, with contacts 22 and 29 and 23 and 38, pairwise, respectively, now being coupled. A current path is now established through contacts 17 and 19 by blade 16, contacts 23 and 38 by the lower blade of switch 24, to the cooling means 39. With the above described action of switch 24, and bearing in mind the downward position of blade 16 of switch 15, it will be observed that the timer 32 is no longer energized and accordingly will revert to its unenergized state, thereby ready to begin a new timing cycle whenever energized. Blade 35 of switch 34, being dependent upon energization of timer 32, will now swing upwardly into the full position thereby de-energizing actuator 41.

Cooling of the controlled enclosure being called for, due to the elapse of the timer's period, the bimetal 13 making electrical contact at all temperatures below the control temperature, the blades of switches 15 and 24 will be in the dotted line positions and make possible the energization of cooling means 39 and cooling continues until, at the control temperature, bimetal 13 makes electrical contact. This will actuate relay 12 and blade 16 now swings upwardly to the full position. This will cut off the flow of energy to cooling means 39. Timer 32 will now be energized through a path from contact 17, blade 16, contact 18, lead 20 and the upper blade of switch 24 (in the dotted position). It will be observed that heater 14 is energized during this "off" cooling cycle to anticipate the subsequent need for further cooling. In the event that cooling is again required before the expiration of the period of timer 32, thermostat 13 will actuate relay 12, the bimetal breaking contact above the control point, and blade 16 will again swing downwardly and cooling means 39 will again receive energy.

In the event that cooling is not required during the period of timer 32, blade 16 will be held in the upper position by relay 12, since the bimetal of thermostat 13 will continue to make contact. At the end of the period of timer 32, blade 35 of switch 34 will (again) swing downwardly into the dotted position, energizing actuator 41. Energization of actuator 41 will cause the blades of stepping switch 24 to swing upwardly into the full position thus completing the circuit through the heating means 27. Under these circumstances, the system is on heating operation and all components have assumed the original illustrated position.

In the event that thermostat 13 senses a new condition, thereby changing the position of blade 16 through the action of relay 12, it may still be necessary to wait the full period of timer 32 to obtain an opposite action (either heating or cooling) from the system condition which obtained before reversal. Manual switch 42 may in such situations be actuated, if desired, thereby instantaneously changing the position of stepping switch 24 by energizing actuator 41 and hence obtaining an opposite action from the system.

I claim:

1. An all-year air conditioning system including a thermostat in combination with a first switch, said thermostat's response to various ambient temperatures operating said first switch between a heating position and a cooling position, a second switch, said second switch having two input terminals secured to the contacts of said first switch which correspond to said heating and cooling position, respectively, said second switch having three output terminals, one coupled to a heating means, one to a cooling means, and the third to a timing means having a certain period, means to actuate said second switch to, successively, one of said first mentioned terminals upon the running of said period, said timing means being actuated and its period inaugurated upon a change in the position of said first switch occasioned by a change in temperature from a predetermined level as sensed by said thermostat.

2. An all-year air conditioning system including a thermostat in combination with a first relay, said thermostat assuming an electrically open state under one range of ambient temperatures and an electrically closed state under another range of ambient temperatures, said thermostat actuating said first relay, the first relay actuating a first switch between two positions, the two first switch positions corresponding to the said states of the relay, a second switch, having two input terminals and three output terminals, said input terminals secured to the terminals of said first switch, one of said output terminals coupled to heating means, another of said output terminals secured to cooling means, the third of said output terminals secured to timing means having a predetermined, fixed period, means for actuating said second switch upon the continuous running of the period of the timer, actuation of said second switch alternately connecting its said input terminals to alternate pairs of its output terminals, with the output terminal to which the said timer is connected always being connected to one of said input terminals.

3. The all-year air conditioning system of claim 2 wherein said actuating means for the second switch is a relay energized upon actuation of a third switch, said third switch being actuated upon the continuous running of the period of the said timer.

4. The all-year air conditioning system of claim 3 including means for actuating said second switch, independently of the running of the period of the timer.

5. The all-year air conditioning system of claim 4 wherein the said actuating means is a manually operable switch in shunt with said third switch.

6. The all-year air conditioning system of claim 2 wherein both the said heating and said cooling means are provided with limit means to discontinue their action upon abnormal conditions.

7. The all-year conditioning system of claim 1 wherein said thermostat is placed in series electrically with an anticipating heater, said thermostat opening electrical contact at ambient temperatures above a control point and making electrical contact at ambient temperatures below the said control point.

8. The all-year conditioning system of claim 2 wherein said thermostat is placed in series electrically with an anticipating heater, said thermostat opening electrical contact at ambient temperatures above a control point and making electrical contact at ambient temperatures below the said control point.

9. The all-year conditioning system of claim 3 wherein said thermostat is placed in series electrically with an anticipating heater, said thermostat opening electrical contact at ambient temperatures above a control point and making electrical contact at ambient temperatures below the said control point.

10. The all-year conditioning system of claim 4 wherein said thermostat is placed in series electrically with an anticipating heater, said thermostat opening electrical contact at ambient temperatures above a control point and making electrical contact at ambient temperatures below the said control point.

11. The all-year conditioning system of claim 5 wherein said thermostat is placed in series electrically with an anticipating heater, said thermostat opening electrical contact at ambient temperatures above a control point and making electrical contact at ambient temperatures below the said control point.

12. The all-year conditioning system of claim 6 wherein said thermostat is placed in series electrically with an anticipating heater, said thermostat opening electrical contact at ambient temperatures above a control point and making electrical contact at ambient temperatures below the said control point.

References Cited by the Examiner

UNITED STATES PATENTS

| | | | |
|---|---|---|---|
| 2,495,861 | 1/50 | Newton | 165—12 |
| 2,558,610 | 6/51 | Diekhoff | 165—12 |
| 2,730,336 | 1/56 | Shiers | 165—12 |
| 2,865,610 | 12/58 | Sparrow | 165—12 |

CHARLES SUKALO, *Primary Examiner.*

PERCY L. PATRICK, *Examiner.*